United States Patent
Lehman et al.

(10) Patent No.: US 8,894,919 B1
(45) Date of Patent: Nov. 25, 2014

(54) METHOD FOR INCORPORATION OF INSULATORS AND BULK ABSORBERS IN HIGH TEMPERATURE SANDWICH STRUCTURES AFTER FABRICATION

(75) Inventors: Leanne L. Lehman, Aliso Viejo, CA (US); Vann Heng, Buena Park, CA (US); James Philip Ledesma, Jr., Long Beach, CA (US); Jonathan David Embler, Tustin, CA (US)

(73) Assignee: The Boeing Company, Chicago, IL (US)

( * ) Notice: Subject to any disclaimer, the term of this patent is extended or adjusted under 35 U.S.C. 154(b) by 75 days.

(21) Appl. No.: 13/552,235

(22) Filed: Jul. 18, 2012

(51) Int. Cl.
*C04B 41/65* (2006.01)

(52) U.S. Cl.
USPC ........................................ 264/642

(58) Field of Classification Search
CPC ...... B32B 18/00; C04B 35/80; C04B 41/457; C04B 41/4596; C04B 41/5031; C04B 41/507; C04B 2235/528
USPC ........................................ 264/642
See application file for complete search history.

(56) References Cited

U.S. PATENT DOCUMENTS

| | | | |
|---|---|---|---|
| 6,418,973 B1* | 7/2002 | Cox et al. | 139/383 R |
| 6,660,115 B2* | 12/2003 | Butler et al. | 156/89.11 |
| 6,716,782 B2 | 4/2004 | Heng et al. | |
| 6,770,584 B2 | 8/2004 | Barney et al. | |
| 6,969,546 B2 | 11/2005 | DiChiara, Jr. | |
| 7,497,443 B1* | 3/2009 | Steinetz et al. | 277/644 |
| 2002/0061396 A1* | 5/2002 | White | 428/293.4 |
| 2006/0019087 A1* | 1/2006 | Mazzola et al. | 428/323 |
| 2008/0176020 A1* | 7/2008 | Heng et al. | 428/49 |
| 2009/0004425 A1 | 1/2009 | Lehman et al. | |
| 2009/0019685 A1 | 1/2009 | Keith et al. | |

* cited by examiner

*Primary Examiner* — Erin Snelting
(74) *Attorney, Agent, or Firm* — Smith Moore Leatherwood LLP

(57) ABSTRACT

A method for adding insulation or bulk absorbers into high temperature sandwich structures following fabrication is presented. A slurry of ceramic fibers and/or particles, opacified particles, fugitive fibers, organic binders and inorganic binders is prepared as an aqueous solution. The slurry is cast within a prepared sandwich structure, dried, and heated to form a low density ceramic core material to provide insulation or noise absorption. Following incorporation of the ceramic material, aerogels or phase change materials may also be added to provide additional thermal management benefits.

7 Claims, 3 Drawing Sheets

METHOD FOR INCORPORATION OF INSULATORS AND BULK ABSORBERS IN HIGH TEMPERATURE SANDWICH STRUCTURES AFTER FABRICATION

TECHNOLOGICAL FIELD

The present disclosure relates to methods and apparatuses for adding insulation or bulk absorbers into high temperature structures following their fabrication. More specifically, the present disclosure relates to adding a slurry of ceramic fibers and/or particles and binders prepared as an aqueous solution to a sandwich structure followed by drying and heating to form low density ceramic core materials to provide thermal insulation and/or noise reduction.

BACKGROUND

Ceramic matrix composite (CMC) structures are often used in aerospace and other applications due to their ability to withstand relatively high operating temperatures such as, for example exhaust gases, gases encountered upon re-entry into the Earth's atmosphere, etc. Further, various CMC's have been used to fabricate monocoque structures, or sandwich structures that use foam, tile, truss or honeycomb core constructions. While monocoque structures tend to be thin and lightweight, they exhibit low bending stiffness and cannot efficiently react to normal bending loads. Monocoque structures also exhibit poor stability and can buckle under relatively low compressive loads. Sandwich structures can have much higher bending stiffness with a minimal weight impact and are thus desirable for many structural applications. The fabrication of ceramic composite sandwich structures, and the incorporation of thermal insulation within these structures present several challenges and has been a topic of recent research.

Some sandwich structures made of ceramic matrix composites are processed using multiple matrix slurry infiltration and pyrolysis steps. Presently known solutions involve wrapping previously fabricated insulation with ceramic fabric impregnated with ceramic slurry that could wick into underlying insulation during layup or subsequent matrix infiltration cycles. To convert the ceramic prepreg to a rigid matrix composite, the wrapped insulation is typically sintered or heated at temperatures exceeding from about 2000° F. to about 2800° F. This can result in shrinkage and a coefficient of thermal expansion (CTE) mismatch between the CMC outer skin and the insulation, degradation of the insulation leading to cracking and poor insulation performance, loss of insulating and damping benefits, etc. Other sandwich structures have been prepared using high temperature metals such as steels, titaniums, and nickel based alloys, etc. through hot forming and expansion. Previously, because of the nature of the forming process, insulation and bulk absorbers could not be added during fabrication. In these types of structures, insulating blankets have sometimes been bonded or attached to one side, but are not able to be integrated within the sandwich structure.

BRIEF SUMMARY

This disclosure contemplates the preparation of a ceramic slurry of several different compositions using, for example, alumina fiber, silica fiber, alumina microspheres, boron carbide powder heat treating aids, carbon fiber as a fugitive filler, and/or inorganic binders, such as monoaluminum phosphate, in water. The aqueous slurry is cast into a finished sandwich panel. Excess liquid is drained and removed, preferably with vacuum assistance. The filled sandwich preferably is dried to remove residual water and set the binders. The assembly is then heated to remove organic binders and fuse/stabilize ceramic fibers as insulators within the sandwich structure. Further steps can be taken to optimize thermal properties through the addition of, for example, aerogels, opacifiers, phase change materials, etc. By incorporating insulation after CMC fabrication, the CMC sandwich structure may be fully processed without concern of the problematic CTE mismatch and property degradation ordinarily confronting the incorporation of a rigid insulation material in a CMC. Integration of insulation materials into sandwich structures according to the present disclosure results in a significantly more efficient integrated structure, eliminating the need for external or internal insulation layers, reducing overall weight, thickness, fabrication costs, and part counts, for example.

More specifically the present disclosure relates to methods of forming an insulative structure comprising the steps of providing a sandwich structure having at least two sides defining an interior volume and providing a slurry comprising an insulating particulate mixture in a liquid. The liquid is introduced into the sandwich structure to obtain a sandwich structure filled to a predetermined amount with the slurry. Excess liquid is substantially eliminated from the slurry, and the slurry is then treated to cure the slurry into an insulating layer. Preferably, the sandwich structure is a ceramic matrix composite structure that is made from materials selected from oxide-containing and non-oxide-containing materials. The oxide-containing materials comprise oxide fiber reinforcement in at least one matrix, and preferably comprise alumina, alumina mullite, aluminoborosilicate, quartz, glass, and combinations thereof. The non-oxide-containing materials preferably comprise non-oxide fiber reinforcement in at least one matrix and preferably comprise carbon, silicon carbide, silicon nitride, silicon boride, silicon boronitride, and combinations thereof. The sandwich structure may also comprise titanium based alloys, nickel based alloys, and combinations thereof.

The insulating particulate mixture preferably comprises ceramic fibers including silica-containing fibers, alumina-containing fibers, and combinations thereof, and may further comprise ceramic microspheres made from materials, such as, for example, alumina, alumina mullite, silica, and combinations thereof. Still further, the insulating particulate mixture preferably comprises an organic binder made from a material such as, for example, methylcellulose, acrylic, polyvinyl alcohol, polyvinylpyrrolidone, and combinations thereof and/or an inorganic binder selected from the group consisting of: boron carbide, monoaluminum phosphate, tetraethylorthosilicate, siloxane, colloidal silica, colloidal alumina, and combinations thereof.

Further the present disclosure related to methods of forming an insulative structure comprising the steps of providing a sandwich structure having at least two sides defining an interior volume and providing a slurry comprising an insulating particulate mixture in a liquid. The slurry is introduced into the sandwich structure to obtain a sandwich structure filled to a predetermined amount with the slurry and the excess liquid is substantially eliminated from the slurry such that the slurry remains porous. The porous insulation within the sandwich structure is further treated by adding an amount of aerogel-containing material to the insulation filled sandwich, preferably after slurry processing and heat treatment. The filled sandwich structure is then preferably treated to cure the aerogel-containing material. The aerogel-containing material preferably comprises alumina, silica and combinations thereof.

Still further, the present disclosure contemplates adding an amount of phase change material to the filled sandwich structure during or after the slurry processing, depending on the melting and boiling temperature of the phase change material. Preferred phase change materials include melamine, lithium fluoride, germanium nitride, germanium oxide, gallium nitride and combinations thereof.

In a further alternative, the present disclosure relates to an insulative structure comprising a sandwich structure having at least two sides defining an interior volume and an insulating layer cured from a slurry in situ within the sandwich structure. The sandwich structure is preferably a ceramic matrix composite structure made from materials including oxide-containing and non-oxide-containing materials. Preferably, the oxide-containing materials comprise oxide fiber reinforcement in at least one matrix and the fiber reinforcements are preferably materials including alumina, alumina mullite, aluminoborosilicate, quartz, glass, and combinations thereof, while the matrix preferably includes materials such as alumina, aluminosilicate, alumina mullite, mullite, glass and combinations thereof. The preferred non-oxide-containing materials comprise non-oxide fiber reinforcement in at least one matrix, with the preferred non-oxide fiber reinforcements including materials such as carbon, silicon carbide, silicon nitride, silicon boride, silicon boronitride, and combinations thereof. The non-oxide matrix preferably includes carbon, silicon carbide, silicon nitride, silicon boride, and combinations thereof. The sandwich structure may also be made from titanium based alloys, nickel based alloys, and combinations thereof. Preferably, the insulating layer comprises ceramic fibers preferably including silica-containing fibers, alumina-containing fibers, and combinations thereof. Further the disclosure contemplates the presence in the insulating layer of ceramic microspheres made from a material such as alumina, alumina mullite, silica, and combinations thereof. The insulating layer further comprises organic fibers and organic and inorganic binders. Preferred organic binders include methylcellulose, acrylic, polyvinyl alcohol, polyvinylpyrrolidone, and combinations thereof, while the contemplated inorganic binders include boron carbide, monoaluminum phosphate, tetraethylorthosilicate, siloxane, colloidal silica, colloidal alumina, and combinations thereof. Organic fibers and organic binders become fugitive during heat-treating. Organic fibers are preferably carbon fibers. The insulating layer may further comprise hollowspheres that are preferably alumina filled with silicon carbide, and/or an amount of aerogel-containing material comprising, for example, alumina, silica, mullite, and combinations thereof.

According to a preferred alternative, the insulating layer further comprises an amount of phase change material made from a material such as, for example, melamine, lithium fluoride, germanium nitride, germanium oxide, gallium nitride and combinations thereof.

The methods and structures of the present disclosure find particular utility as external or internal insulating layers in vehicles and objects exposed to extremely high and low temperatures, including hypersonic atmospheric and space vehicles.

BRIEF DESCRIPTION OF THE DRAWINGS

Figure 1:
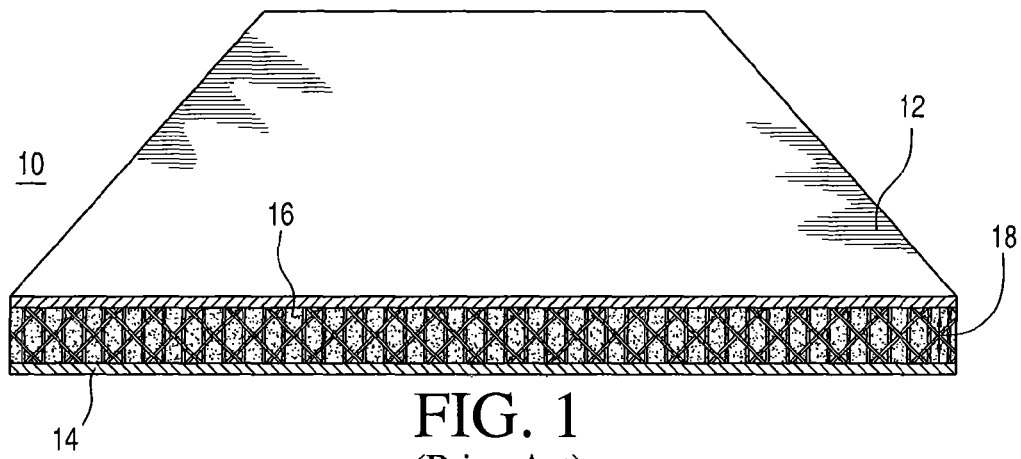
Figure 2A:
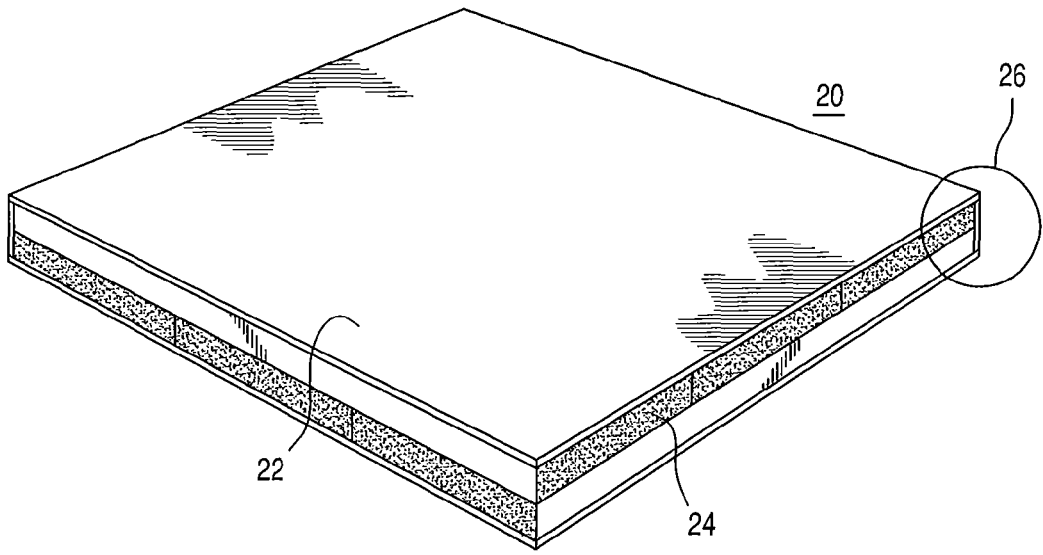
Figure 2B:
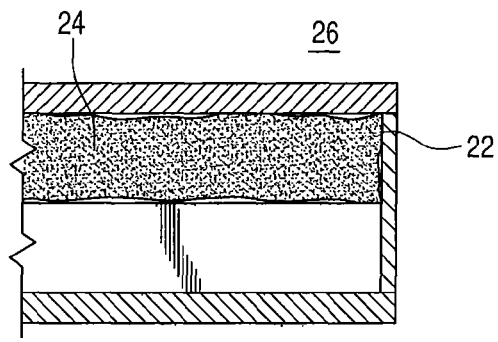
Figure 3:
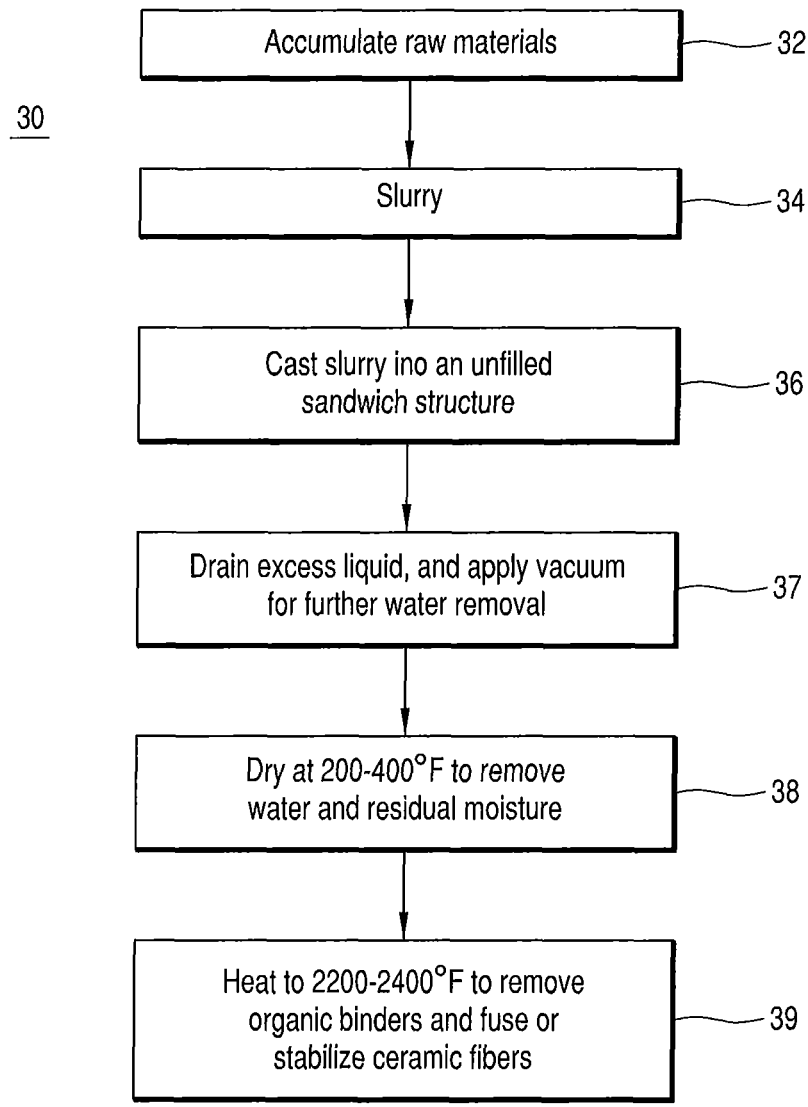
Figure 4:
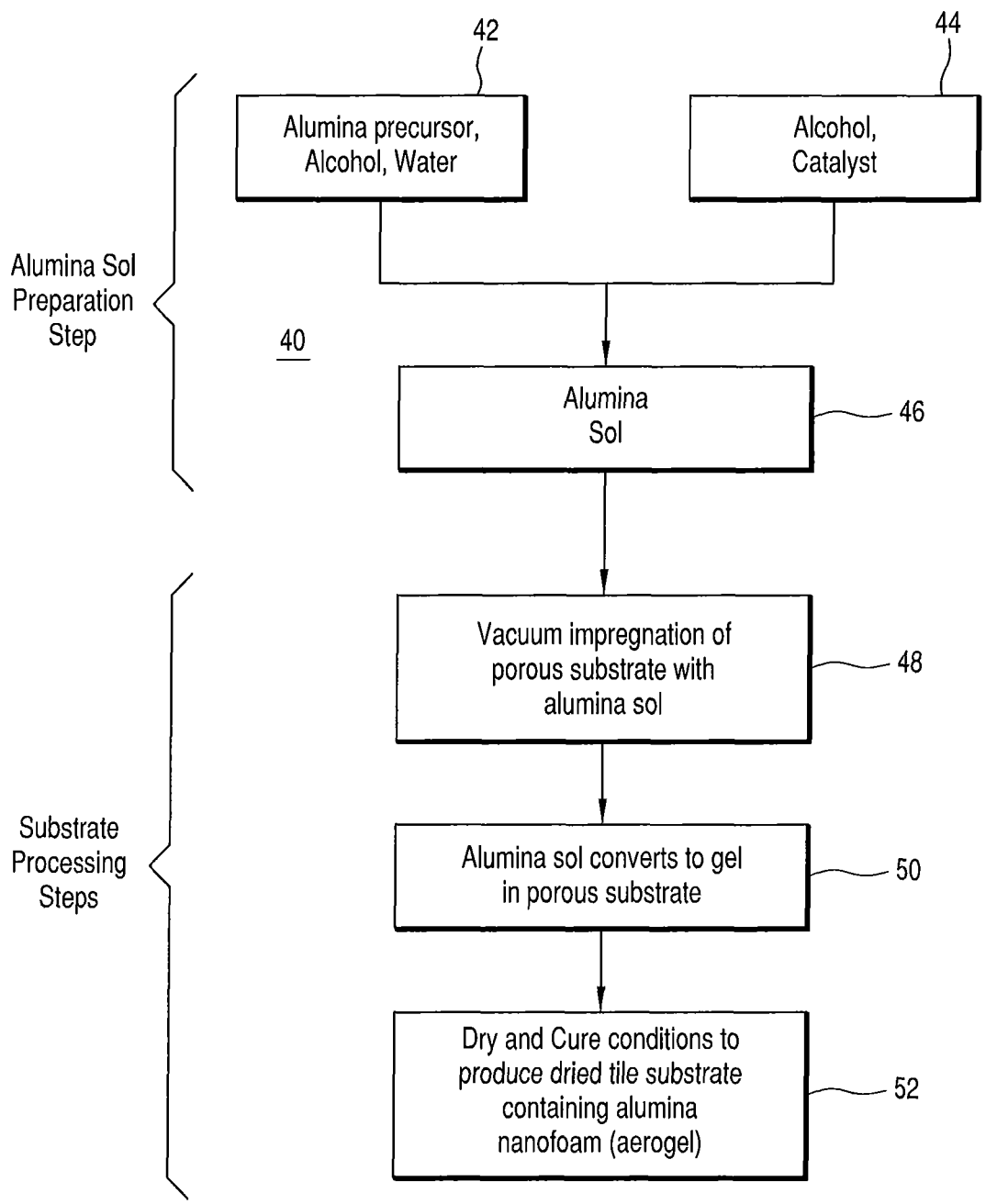

Having thus described variations of the disclosure in general terms, reference will now be made to the accompanying drawings, which are not necessarily drawn to scale, and wherein:

FIG. 1 shows a prior art oxide CMC sandwich with insulation incorporated during the fabrication process;

FIGS. 2a-b show a prior art non-oxide CMC sandwich with insulation incorporated during fabrication process;

FIG. 3 is a schematic diagram showing the basic steps according to one alternative of the present disclosure; and FIG. 4 is a schematic diagram showing the steps for incorporating aerogel particles as a further enhancement to the insulation provided by the schematic shown in FIG. 3.

DETAILED DESCRIPTION

The present invention will be described more fully hereinafter with reference to the accompanying drawings, where preferred alternatives are shown. The disclosures may, however, be embodied in many different forms and should not be construed as limited to the examples set forth. Rather, these examples are provided so that this disclosure will convey the scope of the inventions to those skilled in the field. Like numbers refer to like elements throughout.

FIG. 1 shows a prior art assembly 10 of a CMC sandwich (CMC) with facesheets 12, 14 and core region 18 defined as the region between assembled facesheets 12, 14. Core region 18 comprises an internally located bulk absorber insulation 16. In this assembly as shown, the insulation 16 is presented first and then surrounded by CMC facesheets 12, 14 during the manufacturing process. In other words, core 18 is first prepared with the positioning of insulation 16. Facesheets 12, 14 are then applied to each side of the insulation 16, thus establishing core region 18.

FIGS. 2a-b show a prior art assembly 20 of a CMC sandwich 22 also with insulation 24 surrounded by the CMC during the fabrication process. FIG. 2b is a close up of a section 26 of the assembly 20 shown in FIG. 2b, showing incomplete insulation filling of the CMC insulation 26 due to shrinkage, poor mechanical properties, CTE mismatch, or matrix infiltration into the insulation during manufacture. For oxide-containing CMC sandwich structures, the facesheets do not ordinarily undergo multiple matrix infiltration cycles. It is understood that insulation 24 does not ordinarily penetrate into the surrounding facesheets; the CMC matrix is retained within the facesheets and ordinarily does not penetrate into the insulation. However, non-oxide-containing CMC sandwich structures require multiple matrix infiltration cycles, potentially leading to the damage shown in FIGS. 2a-2b.

FIG. 3 is a schematic diagram of a process 30 according to the present disclosure. According to FIG. 3, an eventual superior insulation material is first formed by accumulating raw materials 32 to prepare an aqueous slurry 34 comprising de-ionized water combined with preferred raw materials comprising ceramic inorganic binders and organic ingredients. Optional microspheres, filled hollowspheres and binders are presented to the mixture, and then blended and stirred to prepare a slurry. The slurry is then presented into empty CMC sandwich panels under pressure or gravity until the panels are substantially or completely filled with the slurry 36. Excess liquid is drained from the filled CMC sandwich by optionally applying a vacuum 37. The filled CMC sandwich is then dried at from about 200 to about 400° F. to remove water and residual moisture 38 and followed with a slow-ramp heating from about 1500° F. to maximum temperatures of about 2400° F. to convert ceramic fibers previously held in the slurry 39 to a finished ceramic insulation. The resulting product is an improved CMC sandwich panel with a tailored density and form-fitting ceramic insulation in place within the sandwich.

Preferred insulation materials to be incorporated into the slurry include ceramic fibers comprising silica, alumina, mullite, etc. and combinations thereof. Ceramic microspheres comprising alumina, alumina mullite, silica, etc. and combinations thereof are also contemplated. Carbon fiber may also be incorporated into the slurry as a fugitive filler to support the blended fibers before heat treating. Preferred organic binders include methylcellulose, acrylic, polyvinyl alcohol, etc., and mixtures thereof. Preferred inorganic binders include boron carbide, monoaluminum phosphate, tetraethylorthosilicate, siloxane, colloidal silica, colloidal alumina, etc. and mixtures thereof.

Various pre-selected and desired properties of the insulation may be imparted via including compounds and particles such as, for example, aerogels, opacifiers and phase change materials. For example, such additives may be presented to the slurry, or to a partially cured ceramic insulation to obtain an insulation having desired optical and thermal properties including, for example, reduced radiation heat transfer by providing the insulation pores with nano-sized particles, reduced effective thermal conductivity by applying a submicron reflective coating to insulation fibers, or abilities to dissipate heat absorption through, for example, phase change properties, etc. The nano-sized particles and reflective coatings are preferably applied using sol-gel techniques that permit substantially uniform coating without undesirably increasing the insulation weight.

FIG. 4 shows a preferred processing route 40 in accordance with the present disclosure for incorporating aerogel particles into the insulation that is already in place within the sandwich as shown in FIG. 3. The aerogel precursor solution is preferably introduced after ceramic insulation is in place and is either partially cured or fully heat treated. According to the process 40, an alumina precursor 42 is combined with an alcohol catalyst 44 to form an alumina solution 46 that is then introduced to the porous ceramic insulation positioned within the CMC sandwich (not shown) via vacuum impregnation 48. The alumina solution converts to a gel state in the porous ceramic insulation 50 and is then dried and cured to produce a substrate containing alumina nanofoam (aerogel) 52.

According to further variations, in addition to the previously disclosed aerogel impregnation, the ceramic insulation may be further predictably tailored as desired through the addition of preselected components. For example, desired opacification is achieved through incorporating reflective or backscatter components into the ceramic slurry mixture. For example, hollow microspheres filled with emittance agents, such as, for example, $SiB_4$ or $SiB_6$, or an opacified nano-sized particle may be added to the ceramic slurry.

Still further, phase change materials such as, for example, melamine, lithium fluoride, germanium nitride, germanium oxide, gallium nitride, etc. may be introduced to the insulation, preferably after placement and heat treating (including but not limited to methods such as, for example, sintering, etc.) within the CMC sandwich. The insulation within the sandwich core provides the phase change materials a large wetting surface area, and the phase change materials maintain distribution in the insulation core when undergoing a phase change. The phase change materials absorb and effectively "store", or otherwise direct and or dissipate heat as they transform from solid to liquid phase. This process alters the rate of ordinary heat transfer from a hot region to a cool region where the CMC sandwich is deployed on a structure. Since this process may be reversible upon exposure to a cooler environment, according to one contemplated alternative, the CMC sandwich filled with the insulations of the present disclosure may render the entire insulation-filled CMC sandwich reusable. This results in significant processing savings in terms of repair, replacement, part inventory, maintenance, vehicle down time, etc.

The present disclosure contemplates providing a ceramic slurry insulation to sandwich structures made from many varying materials. However, especially for the hypersonic atmospheric and space applications, the present disclosure contemplates many preferred oxide and non-oxide based sandwich materials. Preferred oxide based materials include truss or fluted type constructions including fiber reinforcements comprising alumina, alumina mullite, aluminoborosilicate, quartz, glass, etc. Applicable oxide matrices include alumina, aluminosilicate, alumina mullite, mullite glass, etc. Preferred non-oxide-containing materials include truss or fluted type constructions including fiber reinforcements comprising carbon, silicon carbide, silicon nitride, silicon boride, silicon boronitride, etc. Applicable non-oxide matrices include carbon, silicon carbide, silicon nitride, silicon boride, etc. Further, titanium based or nickel based metal sandwiches having flutes, baffles, honeycombs, etc. are contemplated as being benefited by incorporating the present insulations and their methods of manufacture as set forth in this disclosure.

Although most examples here have discussed usefulness of the CMC insulation-filled sandwich in parts designed to be positioned on the exterior or interior of atmospheric and aerospace vehicles and other objects designed for use in space or other upper-atmosphere environments, (such as, for example hypersonic vehicles) further uses abound where exposure to extreme high and cold temperatures are required. Indeed, any required need for sustainable, reusable, and preferably ceramic thermal insulation would find use and benefit from the present disclosure, including, for example, hypersonic manned or unmanned operation of objects in an atmospheric or space environment. Contemplated objects include vehicles, such as, for example, aircraft, satellites, rockets, missiles, etc. and therefore include manned and unmanned aircraft, spacecraft, terrestrial, non-terrestrial and even surface and sub-surface water-borne vehicles and objects.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. A method of forming an insulative structure comprising the steps of:
    providing a sandwich structure having at least two sides defining an interior volume;
    providing a slurry comprising an insulating particulate mixture in a liquid, wherein the insulating particulate mixture comprises filled hollowspheres, said hollowspheres comprising alumina filled with a material selected from the group consisting of: silicon tetraborides, silicon hexaborides and combinations thereof;
    introducing the liquid into the sandwich structure to obtain a sandwich structure filled to a predetermined amount with the slurry;
    substantially eliminating excess liquid from the slurry; and
    heat treating the filled sandwich structure to substantially cure the slurry.

2. The method of claim 1, wherein the sandwich structure comprises a ceramic matrix composite structure.

3. The method of claim 1, wherein the sandwich structure is made from a material selected from the group consisting of: titanium based alloys, nickel based alloys, and combinations thereof.

4. The method of claim 1, wherein the slurry comprises an amount of aerogel-containing material.

5. The method of claim 4, wherein the aerogel-containing material comprises a material selected from the group consisting of: alumina, silica, mullite, and combinations thereof.

6. The method of claim 1, wherein the slurry comprises an amount of phase change material.

7. The method of claim 6, wherein the phase change material is selected from the group consisting of: melamine, lithium fluoride, germanium nitride, germanium oxide, gallium nitride and combinations thereof.

* * * * *